United States Patent
Lallet et al.

(10) Patent No.: US 10,280,268 B2
(45) Date of Patent: May 7, 2019

(54) METHOD FOR PRODUCING A MASTERBATCH OF SYNTHETIC DIENE ELASTOMER AND CARBON-BASED FILLER

(71) Applicant: COMPAGNIE GENERALE DES ETABLISSEMENTS MICHELIN, Clermont-Ferrand (FR)

(72) Inventors: François Lallet, Clermont-Ferrand (FR); Marie Eloy, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 26 days.

(21) Appl. No.: 15/564,491

(22) PCT Filed: Apr. 14, 2016

(86) PCT No.: PCT/FR2016/050868
§ 371 (c)(1),
(2) Date: Oct. 5, 2017

(87) PCT Pub. No.: WO2016/166483
PCT Pub. Date: Oct. 20, 2016

(65) Prior Publication Data
US 2018/0079874 A1   Mar. 22, 2018

(30) Foreign Application Priority Data
Apr. 15, 2015 (FR) ...................... 15 53314

(51) Int. Cl.
C08J 3/215 (2006.01)
B60C 1/00 (2006.01)
C08J 3/22 (2006.01)
C08K 3/04 (2006.01)

(52) U.S. Cl.
CPC .............. *C08J 3/215* (2013.01); *B60C 1/0016* (2013.01); *C08J 3/22* (2013.01); *C08J 3/226* (2013.01); *C08K 3/04* (2013.01); *C08J 2309/08* (2013.01)

(58) Field of Classification Search
CPC ... C08J 3/215; C08J 3/22; C08J 3/226; C08K 3/04; B60C 1/0016
USPC .................................. 523/351; 524/495, 496
See application file for complete search history.

(56) References Cited

FOREIGN PATENT DOCUMENTS

| BE | 541816 | 10/1955 |
|---|---|---|
| JP | 2006 348216 | 12/2006 |
| WO | WO 97/36724 | 10/1997 |
| WO | WO 2013/087685 | 6/2013 |

OTHER PUBLICATIONS

JP 2006/348216 machine translation. Original document date (2006).*
F. Martinez-Pedrero, et al., "Making an elastomeric composite material via the heteroaggregation of a binary colloidal dispersion", The Royal Society of Chemistry, Soft Matter, 2012, vol. 8, No. 33, pp. 8752-8757.

* cited by examiner

*Primary Examiner* — Edward J Cain
(74) *Attorney, Agent, or Firm* — Cozen O'Connor

(57) ABSTRACT

A method for preparing a masterbatch of synthetic elastomer and of carbon-based filler, which comprises the following steps: preparing an aqueous dispersion of carbon-based filler having a zeta potential with the opposite sign to that of an anionic or cationic synthetic elastomer latex, the difference between the potentials of the anionic or cationic elastomer latex and the aqueous dispersion of carbon-based filler being such that the absolute value thereof is greater than or equal to 20 mV, bringing together, and mixing, the anionic or cationic synthetic elastomer latex and the aqueous dispersion of carbon-based filler to obtain a coagulum, recovering the coagulum, and drying the recovered coagulum in order to obtain the masterbatch.

19 Claims, No Drawings

METHOD FOR PRODUCING A MASTERBATCH OF SYNTHETIC DIENE ELASTOMER AND CARBON-BASED FILLER

RELATED APPLICATIONS

This is a U.S. National Phase Application under 35 USC 371 of International Application PCT/FR2016/050868 filed on Apr. 14, 2016.

This application claims the priority of French application no. 1553314 filed Apr. 15, 2015, the entire content of which is hereby incorporated by reference.

FIELD OF THE INVENTION

The invention relates to the preparation of a masterbatch of synthetic diene elastomer and of carbon-based filler.

The term "masterbatch" is understood to mean an elastomer-based composite into which a filler and optionally other additives have been introduced.

BACKGROUND OF THE INVENTION

It is known that, in order to obtain the optimum reinforcing properties imparted by a filler in a tire tread, and thus to obtain high wear resistance, it is generally advisable for this filler to be present in the elastomeric matrix in a final form that is both as finely divided as possible and as uniformly distributed as possible. However, such conditions can be achieved only if this filler has a very good capacity, on the one hand, to be incorporated into the matrix during the mixing with the elastomer and to deagglomerate, disperse and become uniformly distributed in this matrix.

In order to improve the dispersibility of the filler in the elastomeric matrix, it is known practice to make use of a mixture of elastomer and filler in the "liquid" phase. To do this, use is made of an elastomer in latex form and an aqueous dispersion of the filler, commonly referred to as "slurry".

In this field, as early as 1955, the problem of the uniform dispersion of fillers, and especially of carbon black, in rubber had already been raised. Thus, a process for preparing a masterbatch of rubber and of carbon black in the liquid phase is known from document BE 541816. This process is carried out continuously and uses hydraulic shocks or violent mechanical stirring to disperse the carbon black in the elastomeric matrix. Moreover, although this process works with carbon-based fillers, such as carbon blacks, which spontaneously coagulate with natural rubber, it does not make it possible to obtain coagulation with synthetic elastomers. It is therefore necessary to add a "coagulating" agent enabling the agglomeration, and hence coagulation, with synthetic elastomers.

Coagulating agent in the aqueous phase is intended to mean salts such as sodium chloride, acids such as hydrogen chloride, or else bases such as sodium hydroxide.

More recently, document WO 97/36724 discloses a process for preparing a masterbatch and specific equipment making it possible to improve the dispersibility of carbon black in a natural rubber latex. This technology meets two objectives: carrying out the coagulation step in the absence of coagulating agent, and obtaining a masterbatch in which the distribution of the filler is uniform. However, this technology has a certain number of drawbacks. The equipment used is very complex and the process described relies on very precise characteristics linked to this equipment, such as a defined coagulation zone geometry or else a defined flow speed difference.

SUMMARY OF THE INVENTION

Thus, a process for preparing a masterbatch is sought, which results in a masterbatch in which the distribution of the filler is uniform throughout the product, and in which the weight yield and the filler/elastomer ratio are satisfactory, this process having to be easy to carry out using simple equipment, without requiring the use of coagulating agent. This process is particularly advantageous for carbon black which spontaneously coagulates with natural rubber but not with synthetic elastomers.

The applicants have surprisingly discovered a simple method for obtaining a carbon-based filler-synthetic elastomer masterbatch prepared in "liquid" phase, which makes it possible to obtain good dispersion of the filler within the matrix, without using coagulating agent. Moreover, such a method makes it possible not only to achieve a very good coagulation yield (greater than 80% by weight) while respecting the content of filler introduced beforehand (a difference of 20% relative to the content of filler calculated initially being considered to be acceptable).

One aspect of the invention relates to a method for preparing a masterbatch of synthetic elastomer and of carbon-based filler, which comprises the following steps:

preparing an aqueous dispersion of carbon-based filler having a zeta potential with the opposite sign to that of an anionic or cationic synthetic elastomer latex, the difference between the potentials of the anionic or cationic elastomer latex and the aqueous dispersion of carbon-based filler being such that the absolute value thereof is greater than or equal to 20 mV, bringing together, and mixing, the anionic or cationic synthetic elastomer latex and the aqueous dispersion of carbon-based filler to obtain a coagulum, recovering the coagulum, drying the recovered coagulum in order to obtain the masterbatch.

For the purposes of the invention, carbon-based filler is intended to mean a particulate object containing only carbon atoms in its mass, "impurities aside", it being understood that there may be other atoms at the surface.

A carbon-based filler may be chosen, nonlimitingly, from carbon blacks, natural and synthetic graphites, carbon fibres, graphenes, fullerenes, acetylene blacks and carbon nanotubes.

According to an embodiment of the invention, the synthetic elastomer is a synthetic diene elastomer.

The difference between the zeta potentials of the anionic or cationic elastomer latex and of the aqueous dispersion of carbon-based filler preferentially has by an absolute value which is greater than or equal to 30 mV.

According to another embodiment of the invention, the aqueous dispersion of carbon-based filler contains a surfactant with the opposite sign to that of the synthetic elastomer latex.

The anionic or cationic synthetic elastomer latex advantageously contains at least one surfactant, respectively anionic or cationic.

According to an embodiment of the invention, the synthetic elastomer latex is obtained by aqueous phase polymerization.

According to another embodiment of the invention, the synthetic elastomer latex is obtained by aqueous phase emulsification of a diene elastomer.

The synthetic elastomer latex is preferably a latex of butadiene and stirene copolymer, SBR, and even more preferentially the synthetic elastomer latex is an SBR prepared in emulsion.

According to a variant embodiment of the invention, the carbon-based filler consists of carbon black; the amount of carbon-based filler during the bringing together of the two aqueous dispersions preferably ranges from 2 phom to 150 phom, parts by weight per hundred parts of organic matter.

Another aspect of the invention is related to a masterbatch of synthetic diene elastomer and of carbon-based filler obtained according to the method mentioned above, and also a composition based on at least one such masterbatch.

Another aspect of the invention relates to a finished or semi-finished article comprising a composition as mentioned above, a tire tread comprising such a composition and a tire or semi-finished product comprising at least one such composition.

I. MEASUREMENTS AND TESTS

I.1 Measurement of the Zeta Potential

As used here, the zeta potential is a scientific term denoting the electrokinetic potential in colloidal systems. In the literature relating to colloidal chemistry, it is generally denoted using the Greek letter zeta, hence potential.

The zeta potential is a measure of the amplitude of the repulsion or attraction between particles. The zeta potential is indicative of the amplitude of the interaction between colloidal particles, and measurements of zeta potential are used to ascertain the stability of colloidal systems.

Most colloidal dispersions in aqueous medium bear a surface charge. If acidic groups are present at the surface of a particle, the latter will tend to develop a negative surface charge. On the other hand, if basic groups are present at the surface of a particle, the latter will tend to develop a positive surface charge. The amplitude of the surface charge depends on the acidic or basic force of the surface groups and on the pH of the solution. The surface charge can be reduced to zero by suppressing surface ionization by reducing the pH in the case of negatively-charged particles or by increasing the pH in the case of positively-charged particles. Surfactants may be specifically adsorbed onto the surface of a particle, which leads, in the case of cationic surfactants, to a positive surface charge, and in the case of anionic surfactants, to a negative surface charge. See "Zeta Potential an Introduction in 30 Minutes", technical note from the Zetasizer Nano series, page 3 (before September 2010). The appearance of a net charge at the surface of a particle affects the distribution of ions in the surrounding interface region, which leads to an increased concentration of counter-ions, ions of the opposite charge to that of the particle, close to the surface. Thus, there is a double electrical layer around each particle. The liquid layer surrounding the particle is in two parts: an internal region (Stern layer) in which the ions are strongly connected and an external region (diffuse layer) in which they are less well associated. In the diffuse layer, there is an imaginary boundary within which the ions and the particles form a stable entity. When a colloidal particle moves (for example under the effect of thermal agitation), the ions inside the boundary move with it. The ions outside the boundary remain with the dispersant volume. The potential at the boundary (hydrodynamic shear plane) is the zeta potential.

From a theoretical viewpoint, the zeta potential is an electrical potential in the interface double layer (DL) at the location of the slipping plane relative to a point in the volume of fluid far from the interface. In other words, the zeta potential is the potential difference between the dispersion medium and the stationary layer of fluid attached to the dispersed particle.

The zeta potential is widely used to quantify the amplitude of the electric charge at the double layer. The zeta potential must not be confused with the electrode potential or the electrochemical potential (because electrochemical reactions are not generally involved in the appearance of the zeta potential).

In aqueous medium, the pH of the sample affects its zeta potential. For example, if an alkali is added to a suspension with a negative zeta potential, the particles tend to acquire a more negative charge. If a sufficient amount of acid is added to the suspension, a point will be reached at which the charge will be neutralized. The addition of an additional amount of acid will cause an accumulation of positive charge.

The zeta potential cannot be directly measured, but it can be calculated using theoretical models and an electrophoretic mobility or a dynamic electrophoretic mobility determined experimentally. Electrokinetic and electroacoustic phenomena constitute the usual sources of data for calculating the zeta potential. However, for the purposes of the present application, the zeta potential is calculated using electrokinetic phenomena, in particular electrophoresis. Electrophoresis is used to estimate the zeta potential of particles, whereas the streaming current/potential is used for porous substances and flat surfaces.

Electrophoresis is the movement of a charged particle relative to the liquid in which it is suspended, under the influence of an applied electric field. When an electric field is applied through an electrolyte, the charged particles suspended in the electrolyte are attracted to the electrode of opposite charge. The viscous forces acting on the particles tend to oppose this movement. When equilibrium is reached between these two opposing forces, the particles move at a constant speed.

The speed depends on the intensity of the electric field or on the voltage gradient, on the dielectric constant of the medium, on the viscosity of the medium and on the zeta potential.

The speed of the particle in a uniform electric field is referred to as its electrophoretic mobility. The zeta potential is linked to the electrophoretic mobility by the Henry equation: $U_E=(2\varepsilon\zeta f(\kappa a))/3\eta$ in which $U_E$=electrophoretic mobility, $\zeta$=zeta potential, $\varepsilon$=dielectric constant, $\eta$=viscosity and $f(\kappa a)$=Henry's function. The unit $\kappa$, referred to as the Debye length, is the inverse of a length, and $\kappa^{-1}$ is often considered to be a measure of the "thickness" of the electric double layer. The parameter "a" refers to the radius of the particle, and consequently $\kappa a$ measures the relationship between the radius of the particle and the thickness of the electric double layer. Electrophoretic determinations of the zeta potential are most often made in aqueous medium and at a moderate electrolyte concentration; in this case, $f(\kappa a)$ is equal to 1.5, which corresponds to the Smoluchowski approximation.

Consequently, calculation of zeta potential from the mobility is simple for systems that fit the Smoluchowski model, that is to say particles larger than approximately 0.2 $\mu m$ (200 nm) dispersed in electrolytes containing more than $10^{-3}$ M (M=mole·$l^{-1}$) of salt. For small particles in low dielectric constant media (for example non-aqueous media), f(κa) becomes equal to 1.0 and allows an equally simple calculation. This is referred to as the Huckel approximation.

Thus, the particles within the dispersion with a zeta potential will migrate towards the electrode of opposite charge at a speed proportional to the amplitude of the zeta potential. The essence of a conventional microelectrophoresis system is a capillary cell with electrodes at both ends, to which electrodes a potential is applied. The particles move towards the electrode and their speed is measured and expressed in a uniform field of intensity, like their mobility. The first methods involved the process of direct observation of individual particles using ultramicroscopic techniques, and manually monitoring their progression over a measured distance. Although this procedure is still used by numerous groups around the world, it has several drawbacks, starting with the significant amount of effort required to carry out a measurement, in particular with small particles or particles which are weakly scattering.

More generally, this speed is measured using the laser Doppler anemometry technique. The frequency shift or phase shift of an incident laser beam caused by these particles in motion is measured as the mobility of the particles, and this mobility is converted into zeta potential by introducing the viscosity and the dielectric permittivity of the dispersant and by applying Smoluchowski's theories.

The Zetasizer Nano series, available from Malvern Instruments, United Kingdom, uses a combination of laser Doppler velocimetry and phase analysis light scattering (PALS) in a patented technique referred to as M3-PALS in order to measure the electrophoretic mobility of a particle.

A system for measuring the zeta potential from the Zetasizer Nano series, available from Malvern Instruments, comprises six main components. Firstly, a laser is used to provide a light source, in order to illuminate the particles within the sample. For measurements of zeta potential, this light source is separated to obtain an incident beam and a reference beam. The incident laser beam passes through the centre of the sample cell, and the light scattered at an angle of approximately 13° is detected. When an electric field is applied to the cell, any particle moving through the measurement volume causes the intensity of light detected to fluctuate with a frequency proportional to the speed of the particles, and this information is transferred to a digital signal processor, then to a computer. The Zetasizer Nano software generates a frequency spectrum from which the electrophoretic mobility and hence the zeta potential are calculated. The intensity of the scattered light detected must be within a specific range for the detector to measure it correctly. For this purpose, an attenuator is used which adjusts the intensity of the light reaching the sample and hence the intensity of the scattering. In order to correct any differences in the thickness of the cell wall and in dispersant refraction, compensation optics are installed in order to maintain optimal alignment.

The zeta potential is measured on a Zetasizer Nano-ZS model sold by Malvern Instruments, on a sample of latex or slurry diluted 100-fold in a solution of $10^{-3}$M NaCl. The sample preparation protocol for the measurement of zeta potential is as follows:

Prepare 1000 ml of a stock solution of $10^{-3}$M NaCl by introducing 58 mg of NaCl into a 1000 ml volumetric flask and add ultra-pure water up to the filling mark.

Prepare the measurement sample by introducing 1 ml of latex or slurry into a 100 ml volumetric flask and add the $10^{-3}$M NaCl stock solution up to the filling mark.

Thus, when the zeta potentials $\zeta_1$ and $\zeta_2$ of the dispersion of filler and of the synthetic elastomer latex, respectively, have opposite signs, the difference between these zeta potentials, $\Delta\zeta$, has an absolute value $|\Delta\zeta|$ corresponding to $|\zeta_1-\zeta_2|$; this value $|\Delta\zeta|$ having to be greater than or equal to 20 mV, and more preferentially greater than or equal to 30 mV.

I.2 Measurement of the Content of Filler by TGA

The aim of this procedure is to quantify the categories of constituents of the rubber mixtures. 3 temperature ranges are distinguished, which each correspond to a category of constituents:

1. between 250° C. and 550° C., organic matter: elastomers, oils, vulcanization agents, etc.
2. between 550° C. and 750° C., carbon-based fillers.
3. above 750° C., ash: ZnO, and silica where appropriate.

It applies both to uncured mixtures and cured mixtures.

a)—Equipment

Thermogravimetric analysis assembly on an analyser of METTLER TOLEDO brand: model TGA 851 or TGA DSC1.

1/100 mg balance make and model of the balance.

70 µl alumina crucibles (without cover) Mettler Toledo ref 00024123.

Various laboratory equipment: clamps, scissors, etc.

b)—Principle

The weight losses of a sample of mixture subjected to a temperature rise are monitored. This is done in 2 steps:

Heating from 25° C. to 550° C. under inert atmosphere ($N_2$) to evaporate volatile matter and pyrolyse organic matter. The volatility of the resulting products gives rise to a loss of weight corresponding firstly (below 250° C.) to the volatile matter, then to the organic matter initially present in the mixture.

Continuing the heating up to 750° C. under oxidizing atmosphere (air or $O_2$) to produce combustion of the black (and/or charcoal-based matter). The volatility of the resulting products gives rise to a loss of weight corresponding to the initial amount of black (and/or charcoal-based matter).

The products remaining after these treatments constitute ash. This is generally inorganic materials of ZnO or silica type, etc.

c)—Measurements c)-1—Preparation of Samples

The amount of product analysed must be weighed to the nearest 0.01 mg and be between 20 mg and 30 mg.

It is then placed in a 70 µl alumina crucible (without cover).

c)-2—Definition of the "Method" (Temperature Programme)

The following segments are defined in succession:

$1^{st}$ segment: dynamic segment from 25° C. to 550° C. at 50° C./min under nitrogen (40 ml/min);

$2^{nd}$ segment: dynamic segment from 550° C. to 750° C. at 10° C./min under air (or $O_2$) (40 ml/min).

The "blank curve subtraction" field is activated.

Any measurement is automatically corrected by a blank curve. The latter is produced under the same conditions as the measurement, but with an empty crucible. It is stored in memory and used for all the following measurements (no new blank test necessary before each measurement).

c)-3—Starting the Measurement

By consulting the control window of the furnace, a prior check is made to ensure that the nitrogen and air flow rates are suitably set (40 µl/min). If not, they are adjusted using the settings located on the "gas box".

Blank Curve

The blank curve is produced using the procedure described in the TGA operating manual.

Measurement

The measurement is carried out using the procedure described in the TGA operating manual.

c)-4—Use of the Curve

Following the instructions of the TGA operating manual:
the curve to be used is selected and opened;
the $1^{st}$ stationary phase, corresponding to the volatile matter, is defined on this curve between 25° C. and approximately 250° C. respectively;
the weight loss corresponding to the content of volatile matter (in %) is calculated;
the $2^{nd}$ stationary phase, corresponding to the organic matter, is defined on this curve between the temperature of the $1^{st}$ stationary phase, approximately 250° C., and 550° C. respectively;
the weight loss corresponding to the content of organic matter (in %) is calculated;
the $3^{rd}$ stationary phase, corresponding to the losses, is defined on this curve between 550° C. and 750° C. respectively;
the weight loss corresponding to these losses (in %) is calculated;
the residue or ash content in % is calculated.

c)-5—Presence of Volatile Compounds

For some mixtures containing volatile compounds which may evaporate at room temperature, there is a risk of loss of matter between the preparation of the sample and the actual start of the measurement.

These losses are not taken into account by the apparatus.

To take these losses into account and obtain the actual composition of the mixture, the following procedure may be carried out:

Steps c)-1 to c)-3 described above are carried out with the following two instructions:
during preparation of the sample: the weight of the empty crucible (P0) and the weight of the sample P1 are noted;
during starting of the measurement: P0 and P1 are entered in the "crucible weight" field and the "sample weight" field respectively.

For the use (step c)-4), the TGA machine takes into account, for determining the losses, the weight of the sample P2 which it calculates at the actual start of the measurement from the weight of the crucible, this being of paramount importance for calculating the residue; P2 is calculated by the TGA machine taking into account the weight P3 (crucible+sample) at the time T0–P0.

The contents of the different constituents and of the residue are calculated relative to the sample weight P1 defined during the preparation and not relative to P2.

The content of volatile matter then calculated by the apparatus is erroneous since a portion of VM, volatile matter (P1–P2), has evaporated during the waiting period between preparation and actual start of the measurement.

The VM values must therefore be manually recalculated:
in terms of weight: VM mg=(P1–P2) mg+$1^{st}$ stationary phase losses mg.
in terms of content: Ct VM %=VM mg/P1*100 or 100–$1^{st}$ stationary phase residue %.

c)-6—Content of Filler in Phom

The content of filler is expressed in phom (phom=parts by weight per hundred parts of organic matter) and is obtained by calculation, when the TGA measurement is interpreted, with the following formula:

$$Ct\ filler(phom)=[(C)/(B+D)]*100$$

in which B represents the percentage of organic matter (interval between 250° C. and 550° C.), C represents the percentage of losses (between 550° C. and 750° C.) and D represents the percentage of residue (above 750° C.).

The difference in % from the target content of filler $FC_t$ is calculated with the following expression, in which $FC_m$ represents the content of filler measured by TGA with the above formula:

$$D(\%)=[FC_m-FC_t)/(FC_t)]*100$$

This value is additional to the coagulation yield, to evaluate the level of control of the technology.

Measurement of the Coagulation Yield

The coagulation yield corresponds to the ratio of the dry weight recovered (from which has been deducted the weight of the volatile matter as defined in the TGA measurement protocol in the preceding paragraphs) to the weight targeted at the outset, multiplied by one hundred.

II. DETAILED DESCRIPTION

The method for preparing a masterbatch of synthetic elastomer and of carbon-based filler according to the invention comprises the following steps:
preparing an aqueous dispersion of carbon-based filler having a zeta potential with the opposite sign to that of an anionic or cationic synthetic elastomer latex, the difference between the potentials of the anionic or cationic elastomer latex and the aqueous dispersion of carbon-based filler being such that the absolute value thereof is greater than or equal to 20 mV,
bringing together, and mixing, the anionic or cationic synthetic elastomer latex and the aqueous dispersion of carbon-based filler to obtain a coagulum,
recovering the coagulum,
drying the recovered coagulum in order to obtain the masterbatch.

II.1 Synthetic Elastomer Latex

For the purposes of the present invention, elastomer in latex form is intended to mean an elastomer which is in the form of elastomer particles dispersed in water.

The invention relates to synthetic elastomer lattices and more particularly diene elastomers, which are defined as follows:

A "diene" elastomer or rubber should be understood, in a known way, as meaning an elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not come within the preceding definition and can especially be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, "diene elastomer capable of being used in the compositions in accordance with the invention" is intended more particularly to mean:

(a)—any homopolymer obtained by polymerization of a conjugated diene monomer having from 4 to 12 carbon atoms;
(b)—any copolymer obtained by copolymerization of one or more conjugated dienes with one another or with one or more vinylaromatic compounds having from 8 to 20 carbon atoms;
(c)—a ternary copolymer obtained by copolymerization of ethylene and of an α-olefin having 3 to 6 carbon atoms with a non-conjugated diene monomer having from 6 to 12 carbon atoms, such as, for example, the elastomers obtained from ethylene, from propylene with a non-conjugated diene monomer of the abovementioned type, such as especially 1,4-hexadiene, ethylidenenorbornene, dicyclopentadiene;
(d)—a copolymer of isobutene and of isoprene (butyl rubber) and also the halogenated versions, in particular chlorinated or brominated versions, of this type of copolymer.

By way of conjugated dienes, the following are especially suitable: 1,3-butadiene, 2-methyl-1,3-butadiene, 2,3-di($C_1$-$C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, or 2,4-hexadiene. By way of vinylaromatic compounds, the following are for example suitable: stirene, ortho-, meta- or para-methylstirene, the commercial mixture "vinyltoluene", para-(tert-butyl)stirene, methoxystirenes, chlorostirenes, vinylmesitylene, divinylbenzene or vinylnaphthalene.

The copolymers can contain between 99% and 20% by weight of diene units and between 1% and 80% by weight of vinylaromatic units. The elastomers can have any microstructure which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. For coupling to carbon black, mention may be made for example of functional groups comprising a C—Sn bond or amino functional groups such as aminobenzophenone, for example; for coupling to a reinforcing inorganic filler such as silica, mention may be made for example of silanol or polysiloxane functional groups having a silanol end (as described for example in FR 2 740 778 or U.S. Pat. No. 6,013,718, and WO 2008/141702), alkoxysilane groups (as described for example in FR 2 765 882 or U.S. Pat. No. 5,977,238), carboxylic groups (as described for example in WO 01/92402 or U.S. Pat. No. 6,815,473, WO 2004/096865 or US 2006/0089445) or else polyether groups (as described for example in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

Polybutadienes are suitable, and in particular those having a content (mol %) of -1,2- units of between 4% and 80% or those having a content (mol %) of cis-1,4- of greater than 80%, polyisoprenes, butadiene/stirene copolymers and in particular those having a Tg (glass transition temperature, Tg, measured according to ASTM D3418) of between 0° C. and −70° C. and more particularly between −10° C. and −60° C., a stirene content of between 5% and 60% by weight and more particularly between 20% and 50%, a content (mol %) of -1,2- bonds of the butadiene part of between 4% and 75%, a content (mol %) of trans-1,4- bonds of between 10% and 80%, butadiene/isoprene copolymers and especially those having an isoprene content of between 5% and 90% by weight and a Tg of −40° C. to −80° C., isoprene/stirene copolymers and especially those having a stirene content of between 5% and 50% by weight and a Tg of between −5° C. and −50° C. In the case of butadiene/stirene/isoprene copolymers, those which are more especially suitable are those having a stirene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of -1,2- units of the butadiene part of between 4% and 85%, a content (mol %) of trans-1,4- units of the butadiene part of between 6% and 80%, a content (mol %) of -1,2- plus -3,4- units of the isoprene part of between 5% and 70% and a content (mol %) of trans-1,4- units of the isoprene part of between 10% and 50%, and more generally any butadiene/stirene/isoprene copolymer having a Tg of between −5° C. and −70° C.

To summarize, the diene elastomer or elastomers of the composition according to the invention are preferentially selected from the group of highly unsaturated diene elastomers consisting of polybutadienes (abbreviated to "BR"s), synthetic polyisoprenes (IRs), butadiene copolymers, isoprene copolymers and the mixtures of these elastomers. Such copolymers are more preferentially selected from the group consisting of butadiene/stirene (SBR) copolymers, isoprene/butadiene (BIR) copolymers, isoprene/stirene (SIR) copolymers and isoprene/butadiene/stirene (SBIR) copolymers.

The synthetic diene elastomer latex (or synthetic rubber latex) may consist of a synthetic diene elastomer already available in the form of an emulsion (for example a copolymer of butadiene and of stirene, SBR, prepared in emulsion) or consist of a synthetic diene elastomer initially in solution (for example, an SBR prepared in solution) which is emulsified in a mixture of organic solvent and water, generally by means of a surfactant.

A latex of SBR, especially an SBR prepared in emulsion ("ESBR") or an SBR prepared in solution ("SSBR"), and more particularly an SBR prepared in emulsion, is particularly suitable for the invention.

There are two main types of processes for the emulsion copolymerization of stirene and butadiene, one of them, or hot process (carried out at a temperature close to 50° C.), being suitable for the preparation of highly branched SBRs, whereas the other, or cold process (carried out at a temperature which can range from 15° C. to 40° C.), makes it possible to obtain more linear SBRs.

For a detailed description of the effectiveness of several emulsifiers which can be used in said hot process (as a function of the contents of said emulsifiers), reference may be made, for example, to the two papers by C. W. Carr, I. M. Kolthoff, E. J. Meehan, University of Minnesota, Minneapolis, Minn. which appeared in the Journal of Polymer Science of 1950, Vol. V, no. 2, pp. 201-206, and of 1951, Vol. VI, no. 1, pp. 73-81.

Regarding comparative exemplary embodiments of said cold process, reference may be made, for example, to the paper in Industrial and Engineering Chemistry, 1948, Vol. 40, no. 5, pp. 932-937, E. J. Vandenberg, G. E. Hulse, Hercules Powder Company, Wilmington, Del. and to the paper in Industrial and Engineering Chemistry, 1954, Vol. 46, no. 5, pp. 1065-1073, J. R. Miller, H. E. Diem, B. F. Goodrich Chemical Co., Akron, Ohio.

In the case of an SBR elastomer (ESBR or SSBR), use is especially made of an SBR having a moderate stirene content, for example of between 20% and 35% by weight, or a high stirene content, for example from 35% to 45%, a content of vinyl bonds of the butadiene part of between 15% and 70%, a content (mol %) of trans-1,4- bonds of between 15% and 75% and a Tg of between −10° C. and −55° C.; such an SBR may advantageously be used as a blend with a BR preferably having more than 90% (mol %) of cis-1,4-bonds.

Anionic or cationic elastomer latex is intended to mean a latex, the zeta potential of which is strictly less than 0 mV or, respectively, strictly greater than 0 mV, and the absolute value of which is greater than or equal to 10 mV. This is because this lower limit makes it possible to ensure the stability of the measurement carried out.

II.2 Preparation of the Aqueous Dispersion of Carbon-Based Filler

Any carbon-based filler may be used for the invention, such as carbon blacks, natural and synthetic graphites, carbon fibres, graphenes, fullerenes, acetylene blacks and carbon nanotubes.

The carbon blacks conventionally used in tires ("tire-grade" blacks) are particularly suitable for the invention. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series 500, 600 or 700, for example the N550, N660, N683 or N772 blacks (ASTM grades).

The carbon-based filler is then dispersed in water, preferably so as to obtain a dispersion, the viscosity of which is sufficient to be readily "handleable". Thus, for the carbon black, a concentration by weight of black in the dispersion of between 1% and 15% will be preferred. It will be possible for example to produce an aqueous dispersion of carbon black with a content of black in the water of 4% by weight.

Advantageously, to produce the dispersion of carbon black, it is possible to use a homogenizer (such as an apparatus with the commercial name Ultra Turrax sold by IKA), then a microfluidizer (sold by Microfluidics corp).

In a second optional step, a defined amount of aqueous solution of surfactant is introduced into the aqueous dispersion of carbon-based filler, in order to control the zeta potential of the particles of the dispersion, in order for the latter to be such that the difference between the potentials of the anionic or cationic elastomer latex and of the aqueous dispersion of carbon-based filler has an absolute value of greater than or equal to 20 mV.

The carbon-based filler preferably comprises carbon black and even more preferentially the carbon-based filler consists of carbon black.

II.3 Bringing Together of the Two Dispersions

According to one embodiment of the method, the elastomer latex and the aqueous dispersion of carbon-based filler may be brought together and mixed continuously.

According to a preferred embodiment of the method, the elastomer latex and the aqueous dispersion of carbon-based filler may be brought together and mixed batchwise.

In the case of batchwise bringing together, a defined amount of aqueous dispersion of carbon-based filler is introduced into a defined amount of elastomer latex may especially be carried out according to the following protocol:

a defined amount of elastomer latex is weighed into a 200 ml beaker, a magnetic stirrer bar is introduced into the beaker and the elastomer latex is placed under magnetic stirring, a defined amount of aqueous dispersion of carbon-based filler is weighed into a 200 ml beaker, the aqueous dispersion of carbon-based filler is introduced in one go into the beaker containing the elastomer latex under magnetic stirring.

The weights of elastomer latex and of aqueous dispersion of carbon-based filler to be weighed are defined directly by the target weight of the masterbatch, the target content of filler in the masterbatch and the respective fractions by weight of the elastomer latex and of the aqueous dispersion of carbon-based filler.

The weights of elastomer latex $w_L$ and of aqueous dispersion of carbon-based filler $w_S$ to be weighed are defined by the following expressions:

$$w_L = (100/FW_L)*[(wMB_t)/(1+(FC_t/100))]$$

$$w_S = (100/FW_S)*[(100/FW_L)*(FC_t/100)]$$

Where $FW_L$ is the fraction by weight of elastomer latex expressed in %; $FW_S$ is the fraction by weight of the aqueous dispersion of carbon-based filler expressed in %; $FC_t$ is the target content of filler expressed in phom and $wMB_t$ is the target weight of masterbatch.

Advantageously, the target content of carbon-based filler for the masterbatch ranges from 2 phom to 150 phom (parts by weight per hundred parts of organic matter).

In particular, when the carbon-based filler predominantly comprises carbon black, the target content preferably ranges from 30 phom to 110 phom and even more preferentially from 40 phom to 100 phom.

In order to bring together and mix these two dispersions, it is also possible to use any type of apparatus enabling "effective" mixing of two products in the liquid phase; thus, use may be made of a mixer producing a high shear, such as the mixers sold by TOKUSHU KIKA KOGYO Co., Ltd., or by PUC in Germany, by CAVITRON in Germany or by SILVERSON in the United Kingdom.

It is clear that the more effective the mixing step, the better the dispersion. Thus, mixers such as high-shear mixers are preferred.

During this phase of mixing the two dispersions, a coagulum of elastomer and of carbon-based filler forms, either in the form of a single solid element in the solution, or in the form of several separate solid elements (coagulum and aqueous effluents).

II.4 Recovery of the Solid Formed

The solid or solids recovered are filtered or centrifuged. Indeed, the filtering operation, which can be carried out by means of a filtration sieve, may prove to be unsuitable when the coagulum is in the form of numerous small solid elements. In such a case, an additional centrifugation operation is preferably carried out.

At the end of this filtering or centrifugation step, the coagulum obtained is dried, for example in an oven.

At the end of this operation, the content of filler is measured by TGA and the coagulation yield is measured.

II.5 Rubber Composition

Advantageously, the masterbatches produced in this way are able to be used in rubber compositions, especially for tires.

The rubber compositions for tires based on masterbatches according to the invention may also comprise all or some of the common additives customarily used in elastomer compositions intended for manufacturing tires, in particular treads, such as, for example, plasticizers or extending oils, whether the latter are aromatic or non-aromatic in nature, pigments, protective agents, such as antiozone waxes, chemical antiozonants, antioxidants, antifatigue agents, reinforcing resins, methylene acceptors (for example phenolic novolac resin) or methylene donors (for example HMT or H3M), as described, for example, in Application WO 02/10269, a crosslinking system based either on sulphur or on sulphur donors and/or on peroxide and/or on bismaleimides, vulcanization accelerators or vulcanization activators.

Preferably, these compositions comprise, as preferential non-aromatic or very weakly aromatic plasticizing agent, at least one compound selected from the group consisting of naphthenic oils, paraffinic oils, MES oils, TDAE oils, glycerol esters (in particular trioleates), plasticizing hydrocarbon resins having a high Tg preferably of greater than 30° C., and the mixtures of such compounds.

II.6 Manufacture of the Rubber Compositions

The rubber compositions of the invention are manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature of between 130° C. and 200° C., preferably between 145° C. and 185° C., followed by a second phase of mechanical working (sometimes referred to as a "productive" phase) at lower temperature, typically below 120° C., for example between 60° C. and 100° C., during which finishing phase the crosslinking or vulcanization system is incorporated.

By way of example, the first (non-productive) phase is carried out in a single thermomechanical step during which all the necessary constituents, with the exception of the vulcanization system, are introduced into an appropriate mixer such as an ordinary internal mixer. The total kneading time, in this non-productive phase, is preferably between 1 min and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 min and 15 min.

The vulcanization system proper is preferentially based on sulphur and on a primary vulcanization accelerator, in particular on an accelerator of the sulphenamide type. Various known secondary vulcanization accelerators or vulcanization activators, with the exception of zinc and any zinc derivative, such as ZnO, or while observing a zinc content of the composition of less than 0.5 phr and preferably of less than 0.3 phr, such as, for example, fatty acids, such as stearic acid, guanidine derivatives (in particular diphenylguanidine), etc., can be added to this vulcanization system, being incorporated during the first non-productive phase and/or during the productive phase. The sulphur content is preferably between 0.5 phr and 3.0 phr, and that of the primary accelerator is preferably between 0.5 phr and 5.0 phr.

The final composition thus obtained is subsequently calendered, for example in the form of a sheet or a slab, especially for laboratory characterization, or else extruded in the form of a rubber profiled element which can be used, for example, as a tire tread for a passenger vehicle.

III. EXEMPLARY EMBODIMENTS OF THE INVENTION

III.1 Preparation of the Aqueous Dispersion of Carbon-Based Filler

The preparation of an aqueous dispersion of carbon-based filler consists, in a first step, in mechanically dispersing the filler, in this case carbon black N234 sold by Cabot Corporation, in aqueous phase according to the following protocol:

Weighing a defined weight of ultrapure water into a 1000 ml beaker.

Weighing a defined weight of carbon-based filler into the same beaker.

Carrying out a first dispersion step with an IKA model T25 Digital Ultra-Turrax® homogenizer-disperser with rotor-stator of S 25 N-25 G-ST type at a speed of 18 000 rpm for 10 min in the same beaker.

Carrying out a second dispersion step, with an M-110P model microfluidizer with a dispersion cell 87 µm in diameter, sold by MICROFLUIDICS, dispersing the whole volume of aqueous dispersion of carbon-based filler contained in the beaker with an 87 µm cell.

The weights of ultrapure water and of filler to be introduced into the beaker are defined directly by the target content of filler in the aqueous dispersion of carbon-based filler and the total amount of aqueous dispersion of carbon-based filler to be produced.

For all the examples, the fraction by weight of the N234 slurry ($FM_S$) is 4%.

For the calculation of the amount of solution of SDS or solution of CATCl to be introduced into the N234 slurry before bringing together, a hypothesis is made of the optimal degree of adsorption equal to 1.4 molecules/nm$^2$ at the surface of the black for both SDS and CTACl, which makes it possible to deduce the amounts of SDS and of CTACl to be introduced, knowing the specific surface area of N234: 120 m$^2$/g.

For a detailed description of the technical origin of the selected optimal degree of 1.4 molecules/nm$^2$ of SDS or of CTACl to be adsorbed at the surface of the N234, reference may be made to the paper by Martinez-Pedrero, F., Alousque, F., De Gaudemaris, B., Berriot, J., Gaboriaud, F., Bremond, N., Bibette, J., which appeared in Soft Matter, 2012, Vol. VIII, no. 33, pp. 8752-8757.

Table 1 below indicates, for the dispersions of carbon black with the surfactant considered, the zeta potential values obtained in accordance with the method for sample preparation described above and following the measurement protocol described in the user's manual for the Zetasizer Nano-ZS from Malvern Instruments.

III.2 Preparation of the Synthetic Elastomer Lattices

Three separate lattices were used to carry out the following tests:

an e-SBR latex at a fraction by weight of 20.6%, sold under the name SB Latex 1502 by SYNTHOS; denoted here by Latex 1, an e-SBR latex at a fraction by weight of 50.4%, sold under the name Litex SX 1024 by SYNTHOMER; denoted here by Latex 2, an e-SBR latex at a fraction by weight of 4.5% synthesized according to the process described in patent application WO96/19511, hereinafter denoted by Latex 3.

Table 2 indicates, for the abovementioned elastomer lattices, the zeta potential values obtained in accordance with the method for sample preparation described above and following the measurement protocol described in the user's manual for the Zetasizer Nano-ZS from Malvern Instruments.

III.3 Preparation of the Masterbatches

The masterbatches are produced by batchwise bringing together; a defined amount of aqueous dispersion of carbon black N234 prepared according to the teaching of section III.1 is introduced into a defined amount of elastomer latex according to the following protocol:

- a defined amount of elastomer latex is weighed into a 200 ml beaker,
- a magnetic stirrer bar is introduced into the beaker and the elastomer latex is placed under magnetic stirring,
- a defined amount of aqueous dispersion of carbon-based filler is weighed into a 200 ml beaker,
- the aqueous dispersion of carbon-based filler is introduced in one go into the beaker containing the elastomer latex under magnetic stirring.

For each target content of filler in the masterbatches, the weights of elastomer latex, of aqueous dispersion of carbon black and of surfactants used, and the respective fractions by weight of the elastomer latex and of the aqueous dispersion of carbon black, are indicated in table 3 below.

During this phase of mixing the two dispersions, a coagulum of elastomer and of carbon-based filler forms, either in the form of a single solid element in the solution, or in the form of several separate solid elements.

The mixture is kept under magnetic stirring for a few minutes before recovering the coagulum formed.

In order to have identical operating conditions for the different tests, the coagulum formed or the solids formed (commonly referred to as "crumbs") are centrifuged, including in the cases in which the visual appearance of the coagulum makes it possible to envisage a filtering operation.

According to a preferred embodiment of the method, the coagulum is separated from the effluents by centrifugation after transfer into a 250 ml Nalgene bottle, using a Sigma 4K15 bucket centrifuge sold by SIGMA at a temperature of 20° C. and a speed of 9000 rpm for 15 min The masterbatch is obtained by drying the coagulum in an oven at 60° C. under a pressure of 200 mbar until a moisture content of less than 1% by weight is reached.

The content of filler is then measured by TGA (as described in detail at the start of the description), and the coagulation yield is measured.

The coagulation yield is expressed as the fraction by weight, expressed as %, of the weight of masterbatch wMB in relation to the weight of target masterbatch:

$$Y(\%) = (wMB/wMB_t) * 100$$

The measurement of the coagulation yield makes it possible to directly quantify the efficiency of the present generic coagulation method.

III.4 Tests

The following were produced for each of the three above-mentioned lattices, by the method described above:

- masterbatches with a dispersion of N134, without surfactants, with target contents of filler of 60 phom, 80 phom and 100 phom,
- masterbatches with a dispersion of N134, containing SDS as described above, with target contents of filler of 60 phom, 80 phom and 100 phom,
- masterbatches with a dispersion of N134, containing CTACl as described above, with target contents of filler of 60 phom, 80 phom and 100 phom.

The masterbatches A1, B1 and C1 all correspond respectively to masterbatches produced according to sections III.1 to III.3, from the Latex 1 and the carbon black N234, with the following differences:

- $A1_{60}$ is a masterbatch produced with a dispersion of carbon black without surfactants and with a target content of filler of 60 phom,
- $A1_{80}$ is identical to $A1_{60}$ but with a target content of filler of 80 phom,
- $A1_{100}$ is identical to $A1_{60}$ but with a target content of filler of 100 phom,
- $B1_{60}$ is a masterbatch produced with a dispersion of carbon black including SDS and with a target content of filler of 60 phom,
- $B1_{80}$ is identical to $B1_{60}$ but with a target content of filler of 80 phom,
- $B1_{100}$ is identical to $B1_{60}$ but with a target content of filler of 100 phom,
- $C1_{60}$ is a masterbatch produced with a dispersion of carbon black including CTACl and with a target content of filler of 60 phom,
- $C1_{80}$ is identical to $C1_{60}$ but with a target content of filler of 80 phom,
- $C1_{100}$ is identical to $C1_{60}$ but with a target content of filler of 100 phom.

Table 4 presents, for the above masterbatches, the values obtained for the difference from the target content of filler (measured by TGA as detailed above in the description) and also the coagulation yields obtained (also as described above).

Similarly, the masterbatches A2, B2 and C2 all correspond respectively to masterbatches produced according to sections III.1 to III.3, from the Latex 2 and the carbon black N234, with the following differences:

- $A2_{60}$ is a masterbatch produced with a dispersion of carbon black without surfactants and with a target content of filler of 60 phom,
- $A2_{80}$ is identical to $A2_{60}$ but with a target content of filler of 80 phom,
- $A2_{100}$ is identical to $A2_{60}$ but with a target content of filler of 100 phom,
- $B2_{60}$ is a masterbatch produced with a dispersion of carbon black including SDS and with a target content of filler of 60 phom,
- $B2_{80}$ is identical to $B2_{60}$ but with a target content of filler of 80 phom,
- $B2_{100}$ is identical to $B2_{60}$ but with a target content of filler of 100 phom,
- $C2_{60}$ is a masterbatch produced with a dispersion of carbon black including CTACl and with a target content of filler of 60 phom,
- $C2_{80}$ is identical to $C2_{60}$ but with a target content of filler of 80 phom,
- $C2_{100}$ is identical to $C2_{60}$ but with a target content of filler of 100 phom.

Table 5 presents, for the above masterbatches, the values obtained for the difference from the target content of filler (measured by TGA as detailed above in the description) and also the coagulation yields obtained (also as described above).

Finally, the masterbatches A3, B3 and C3 all correspond respectively to masterbatches produced according to sections III.1 to III.3, from the Latex 3 and the carbon black N234, with the following differences:

- $A3_{60}$ is a masterbatch produced with a dispersion of carbon black without surfactants and with a target content of filler of 60 phom, A3$_{80}$ is identical to A3$_{60}$ but with a target content of filler of 80 phom, A3$_{100}$ is identical to A3$_{60}$ but with a target content of filler of 100 phom, B3$_{60}$ is a masterbatch produced with a dispersion of carbon black including SDS and with a target content of filler of 60 phom, B3$_{80}$ is identical to B3$_{60}$ but with a target content of filler of 80 phom, B3$_{100}$ is identical to B3$_{60}$ but with a target content of filler of 100 phom, C3$_{60}$ is a masterbatch produced with a dispersion of carbon black including CTACl and with a target content of filler of 60 phom, C3$_{80}$ is identical to C3$_{60}$ but with a target content of filler of 80 phom, C3$_{100}$ is identical to C3$_{60}$ but with a target content of filler of 100 phom.

Table 6 presents, for the above masterbatches, the values obtained for the difference from the target content of filler (measured by TGA as detailed above in the description) and also the coagulation yields obtained (also as described above).

In light of the three tables 4, 5 and 6, it is observed that regardless of whether the synthetic elastomer lattices are anionic or cationic, there is no coagulation between a synthetic elastomer latex and a dispersion of carbon black without surfactant (all of the masterbatches A1, A2 and A3), either because the degree of coagulation is far below 80%, or because a difference from the target content of filler of greater than 20% is obtained, regardless of the target content of filler.

It is also observed that the masterbatches produced from an anionic synthetic elastomer latex and a dispersion of filler with a negative zeta potential (masterbatches B1 and B2), regardless of the target content of filler, do not make it possible to obtain an acceptable yield and at the same time an acceptable difference from the target content of filler. Similarly, it is observed that, regardless of the target content of filler, the masterbatches produced from a cationic synthetic elastomer latex and a dispersion of filler with a positive zeta potential (masterbatches C3), do not make it possible to obtain an acceptable yield and at the same time an acceptable difference from the target content of filler.

In accordance with the invention, it is observed that the masterbatches produced from anionic or cationic synthetic diene elastomer lattices and a dispersion of filler with the opposite zeta potential (masterbatches B3, C1 and C2), make it possible, regardless of the target content of filler, to have both an acceptable yield (greater than 80%) and at the same time an acceptable difference from the target content of filler (less than 20%).

TABLE 1

| N234 - surfactant | N234 - SDS | N234 - CTACl |
|---|---|---|
| Zeta potential (mV) | −51 ± 2 | −47 ± 2 |

TABLE 2

| Latex | LATEX 1 | LATEX 2 | LATEX 3 |
|---|---|---|---|
| Zeta potential (mV) | −42 ± 2 | −40 ± 2 | −51 ± 2 |

TABLE 3

| Filler-surfactant | N234-SDS ($\zeta$ < 0) | | | N234-CTACl ($\zeta$ < 0) | | |
|---|---|---|---|---|---|---|
| Target content of filler FC$_t$ (phom) | 60 | 80 | 100 | 60 | 80 | 100 |
| Volume fraction of filler (%) | 25.0 | 30.8 | 35.7 | 25.0 | 30.8 | 35.7 |
| Weighings | | | | | | |
| N234 dispersion | 187.5 | 222.2 | 250.0 | 187.5 | 222.2 | 250.0 |
| Aqueous solution of SDS at 20% by weight | 0.6 | 0.7 | 0.8 | — | — | — |
| Aqueous solution of CTACl at 25% by weight | — | — | — | 0.7 | 0.8 | 0.9 |
| LATEX 1 | 60.7 | 53.9 | 48.5 | 60.7 | 53.9 | 48.5 |
| LATEX 2 | 24.8 | 22.0 | 19.8 | 24.8 | 22.0 | 19.8 |
| LATEX 3 | 277.8 | 246.9 | 222.2 | 277.8 | 246.9 | 222.2 |

TABLE 4

| Masterbatches | A1$_{60}$ | A1$_{80}$ | A1$_{100}$ | B1$_{60}$ | B1$_{80}$ | B1$_{100}$ | C1$_{60}$ | C1$_{80}$ | C1$_{100}$ |
|---|---|---|---|---|---|---|---|---|---|
| Difference from the target content of filler (%) | 686 | 561 | 752 | 743 | 551 | 735 | −3 | 6 | 1 |
| Coagulation yield (%) | 44.5 | 51 | 54 | 40 | 47 | 52.5 | 100 | 87.5 | 97 |

TABLE 5

| Masterbatches | A2$_{60}$ | A2$_{80}$ | A2$_{100}$ | B2$_{60}$ | B2$_{80}$ | B2$_{100}$ | C2$_{60}$ | C2$_{80}$ | C2$_{100}$ |
|---|---|---|---|---|---|---|---|---|---|
| Difference from the target content of filler (%) | 187 | 155 | 421 | 287 | 338 | 535 | 15 | −17 | −6 |
| Coagulation yield (%) | 56.5 | 63.5 | 57.5 | 46.5 | 52.5 | 55 | 91 | 83 | 96.5 |

TABLE 6

| Masterbatches | A3$_{60}$ | A3$_{80}$ | A3$_{100}$ | B3$_{60}$ | B3$_{80}$ | B3$_{100}$ | C3$_{60}$ | C3$_{80}$ | C3$_{100}$ |
|---|---|---|---|---|---|---|---|---|---|
| Difference from the target content of filler (%) | 104 | 84 | 24 | 4 | 10 | 6 | 664 | 537 | 471 |
| Coagulation yield (%) | 70.5 | 72.5 | 89 | 98 | 93 | 91 | 43 | 50.5 | 51.5 |

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for preparing a masterbatch of synthetic elastomer and of carbon-based filler, which comprises the following steps:
preparing an aqueous dispersion of carbon-based filler having a zeta potential with the opposite sign to that of an anionic or cationic synthetic elastomer latex, the difference between the potentials of the anionic or cationic elastomer latex and the aqueous dispersion of carbon-based filler being such that the absolute value thereof is greater than or equal to 20 mV;
bringing together, and mixing, the anionic or cationic synthetic elastomer latex and the aqueous dispersion of carbon-based filler to obtain a coagulum;
recovering the coagulum; and
drying the recovered coagulum in order to obtain the masterbatch.

2. The method according to claim 1, wherein the synthetic elastomer is a synthetic diene elastomer.

3. The method according to claim 1, wherein the difference between the zeta potentials of the anionic or cationic elastomer latex and of the aqueous dispersion of carbon-based filler has an absolute value which is greater than or equal to 30 mV.

4. The method according to claim 1, wherein the aqueous dispersion of carbon-based filler contains a surfactant with the opposite sign to that of the synthetic elastomer latex.

5. The method according to claim 1, wherein the anionic or cationic synthetic elastomer latex contains at least one surfactant, respectively anionic or cationic.

6. The method according to claim 1, wherein the synthetic elastomer latex is obtained by aqueous phase polymerization.

7. The method according to claim 6, wherein the synthetic elastomer latex is obtained by aqueous phase emulsification of a diene elastomer.

8. The method according to claim 1, wherein the synthetic elastomer latex is a latex of butadiene and stirene copolymer, SBR.

9. The method according to claim 8, wherein the synthetic elastomer latex is an SBR prepared in emulsion.

10. The method according to claim 1, wherein the amount of carbon-based filler during the bringing together of the two aqueous dispersions ranges from 2 phom to 150 phom, parts by weight per hundred parts of organic matter.

11. The method according to claim 10, wherein the carbon-based filler comprises carbon black.

12. The method according to claim 11, wherein the carbon-based filler consists of carbon black.

13. The method according to claim 11, wherein the amount of carbon-based filler during the bringing together of the two aqueous dispersions ranges from 30 phom to 110 phom.

14. The method according to claim 13, wherein the amount of carbon-based filler during the bringing together of the two aqueous dispersions ranges from 40 phom to 100 phom.

15. A masterbatch of synthetic diene elastomer and of carbon-based filler, obtained according to claim 1.

16. An elastomer composition based on at least one masterbatch according to claim 15.

17. A finished or semi-finished article comprising a composition according to claim 16.

18. A tire tread comprising a composition according to claim 16.

19. A tire or semi-finished product comprising at least one rubber composition according to claim 16.

* * * * *